United States Patent [19]
Kanamori et al.

[11] Patent Number: 4,587,400
[45] Date of Patent: May 6, 1986

[54] THERMAL HEAD

[75] Inventors: Takashi Kanamori; Susumu Shibata; Hideo Sawai; Kenji Kuroki, all of Tokyo, Japan

[73] Assignee: OKI Electric Industry Co., Inc., Tokyo, Japan

[21] Appl. No.: 623,311

[22] Filed: Jun. 22, 1984

[30] Foreign Application Priority Data

Jul. 5, 1983 [JP] Japan ................................ 58-121086

[51] Int. Cl.[4] ......................... B41J 3/20; G01D 15/10
[52] U.S. Cl. ..................................... 219/216; 219/543; 346/76 PH
[58] Field of Search .......................... 219/216 PH, 543; 400/120; 346/76 PH; 338/308, 309, 314

[56] References Cited

U.S. PATENT DOCUMENTS

| | | | |
|---|---|---|---|
| 3,411,122 | 11/1968 | Schiller | 338/308 |
| 3,955,068 | 5/1976 | Shaheen | 219/216 PH |

FOREIGN PATENT DOCUMENTS

| | | | |
|---|---|---|---|
| 3023133 | 1/1982 | Fed. Rep. of Germany | 338/308 |
| 55-118882 | 9/1980 | Japan | 400/120 |
| 56-164876 | 12/1981 | Japan | 400/120 |

OTHER PUBLICATIONS

Graham, A. E., "Flexible Thermal Printhead", IBM Tech. Disc. Bull., vol. 26, No. 8, Jan. 1984, pp. 4134–4135.

Shibata, Susumu, "New Type Thermal Printing Head . . . ", IEEE Trans. on Parts, Hybr., and Pack., vol. PHP-12, No. 3, Sep. 1976, pp. 223-230.

*Primary Examiner*—C. L. Albritton
*Assistant Examiner*—Teresa J. Walberg
*Attorney, Agent, or Firm*—Ratner & Prestia

[57] ABSTRACT

A thermal head for a thermal printer and/or a thermal ink transfer printer having a substrate, a heater layer and a conductive lead layer on the substrate in which a protection layer covering the heater layer has been improved. According to the present invention said protection layer is made of polyimide resin which includes some hard particle of filler of $S_iC$ with a weight ratio to the polyimide solid in the range between 1.1 and 3.2. Since the present protection layer is provided with low curing temperature, the substrate of the present thermal head may be polyimide resin which is not heat-proof. Because of filler in the protection layer, that protection layer is wear-proof, although polyimide layer itself is not wear-proof.

3 Claims, 6 Drawing Figures

THERMAL HEAD

BACKGROUND OF THE INVENTION

The present invention relates to an improvement of a thermal head, in particular, relates to a thermal head with an improved protection layer which covers a heater layer.

The present thermal head is used not only for a thermal printer, but also a thermal ink transfer printer.

A thermal head has at least a substrate, a heater layer deposited on the substrate together with a conductive lead layer for feeding to said heater layer, and a protection layer covering said heater layer.

Conventionally, a protection layer is deposited on a heater layer through sputtering process, or thick film process for the purpose of preventing oxidization and wearing of a heater layer. Said protection layer is conventionally made of $T_{a2}O_5$, $S_iO_2$, or glass.

However, an evaporation process, and/or sputtering process has the disadvantage that the cost of the same is high, although it provides an excellent protection layer. Further, if conventional protection layer is made through a thick film process, it must be fired at high temperature, for instance about 1000° C. When a substrate is made of ceramics, that fired protection layer is available. However, when a substrate is made of plastics, for instance, polyimide film, a fired protection layer is not suitable, since a polyimide film is not heat-proof and unstable at high temperature.

Since a thermal head with a substrate made of ceramics is high in cost, it has been desired to use a polyimide film as a substrate of a thermal head. Although plastics, like polyimide resin, can be coated on a heater layer at low temperature, it is not wear-proof. Therefore, a protection layer which can be coated on a polyimide film with low temperature, and having wear-proof characteristics has been desired.

SUMMARY OF THE INVENTION

It is an object, therefore, of the present invention to overcome the disadvantages and limitations of a prior thermal head by providing a new and improved thermal head.

It is also an object of the present invention to provide a thermal head which has a substrate of polyimide film, and protection layer of plastics.

The above and other objects are attained by a thermal head comprising a substrate, a heater layer and a conductive lead layer attached on the substrate, and a protection layer covering said heater layer, wherein said protection layer is made of polyimide resin including hard particle of filler, said filler is one selected from $S_iC$, $Al_2O_3$, $S_{i3}N_4$, and $T_{a2}O_5$, and weight ratio of the filler to polyimide resin is in the range between 1.1 and 3.2.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
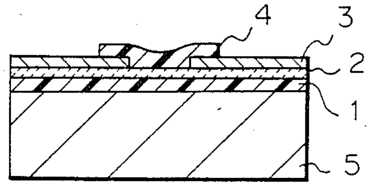
FIG. 1 is a cross section of a thermal head according to the present invention.

FIG. 1 shows a cross section of the present thermal head. In the figure, the numeral 1 is a substrate made of polyimide film, 2 is a heater layer deposited on the substrate 1, 3 is a conductor layer for supplying electric current to the heater layer 2, 4 is a protection layer, and 5 is a radiator for air-cooling the thermal head. The heater layer 2 which is made of resistor material is deposited on the substrate through,, for instance, electroless plating process. That electroless plating process in a thermal head has been proposed by the present applicant in U.S. patent filing No. 584,137, and EP patent filing No. 84301553.8.

According to the present invention, said protection layer 4 is made of polyimide resin which includes silicon-carbide ($S_iC$) as a filler. The diameter of the filler is in the range between 0.01 μm and 3 μm, and the average diameter is 2 μm in our experiment.

Figure 2:
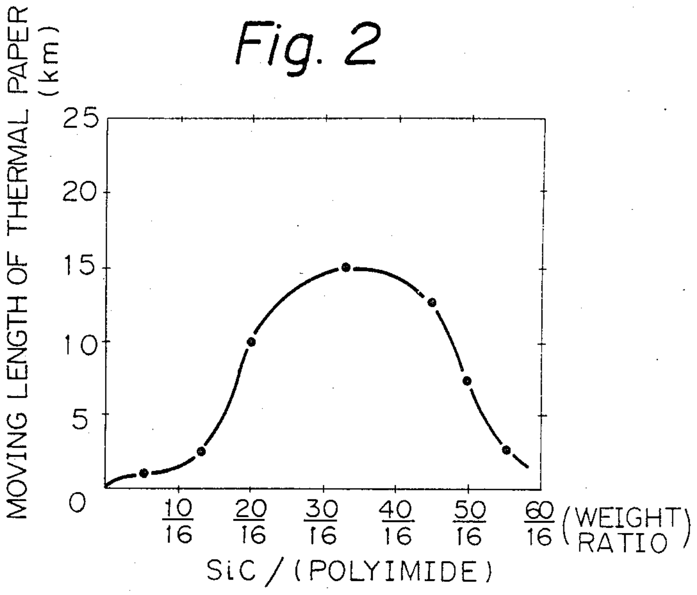
FIG. 2 shows a curve between the weight ratio of $S_iC$ in a protection layer and the wear-proof characteristics of the protection layer.

FIG. 2 shows a curve showing wear-proof characteristics of the present protection layer, in which the horizontal axis shows the weight ratio of $S_iC$ to polymide resin, and the vertical axis shows the moving length (km) of a thermal paper until the protection layer is worn and the heater layer is open without a protection layer.

Figure 3:
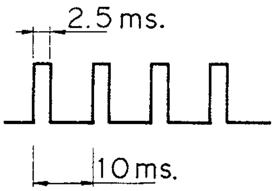
FIG. 3 shows waveforms of a pulse signal utilized in the experiment in FIG. 2, FIGS. 4A and 4B show enlarged views of a protection layer which contains a filler of $S_iC$.

FIG. 3 shows waveform of a pulse signal which is applied to a thermal head in the experimentation of FIG. 2. The pulse signal has, as shown in FIG. 3, the period of 10 mS, and the pulse width of 2.5 mS. And, the power of the pulse signal is designed so that the optical density (OD) of $D=1.3$ is obtained.

FIG. 2 shows that the wear-proof characteristics of the protection layer are excellent when the weight ratio of $S_iC$ to polyimide resin is in the range between 1.1 and 3.2.

FIG. 2 shows also that a protection layer of pure polyimide resin is not wear-proof, and when some filler is included in a polyimide film, the wear-proof characteristics are considerably improved. The filler is not restricted to $S_iC$, but other additives including $Al_2O_3$, $S_{i3}N_4$, $S_iO_2$, and $T_{a2}O_5$ are prooved to provide the similar effect for improving the wear-proof characteristics.

Figure 4A:
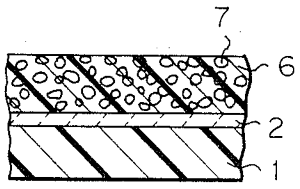
Figure 4B:
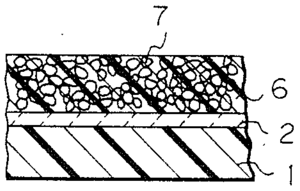

The reason whey the wear-proof characteristics are deteriorated when the ratio of $S_iC$ is higher than 3.2 is described in accordance with FIG. 4. In FIG. 4, the numeral 6 is polyimide resin and 7 is $S_iC$ particles. FIG. 4(a) shows the case where the addition of $S_iC$ is lower (the weight ratio is 1.1), and FIG. 4(b) shows the case that the addition of $S_iC$ is higher (the weight ratio is 3.2). In case of FIG. 4(a), a particle of $S_iC$ is wrapped by polyimide material, since the particles of $S_iC$ are not closely spaced, therefore, the particles of $S_iC$ do not drop out when the protection layer is worn. On the other hand, in case of FIG. 4(b), a particle of $S_iC$ is not completely wrapped by polyimide material, but a particle touches with other particles due to high ratio of $S_iC$. Therefore, a particle drops out when the protection layer is worn. Accordingly, it is preferable that the weight ratio of $S_iC$ to polyimide material be in the range between 1.1 and 3.2.

Figure 5:
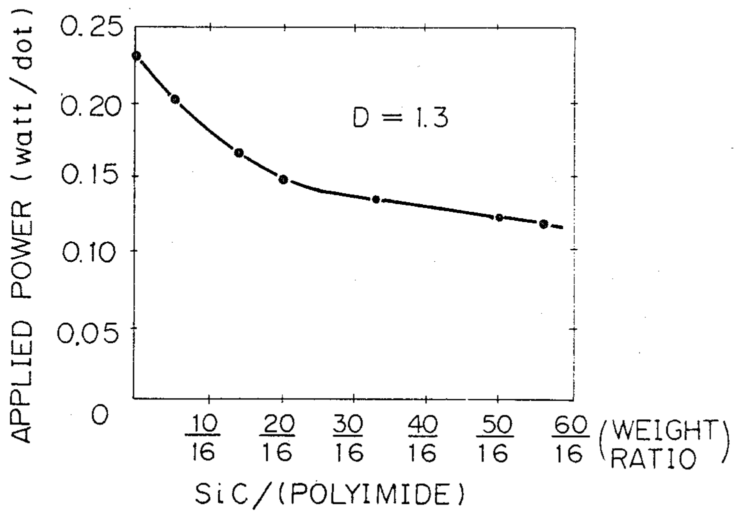
FIG. 5 shows a curve between the weight ratio of $S_iC$ and the necessary power for a thermal head for providing the optical density $D=1.3$.

FIG. 5 shows a curve between the weight ratio of $S_iC$ to polyimide material, and the necessary power to a thermal head for providing the printed optical density (OD) D=1.3. As shown in FIG. 5, the less power is required when the ratio of $S_iC$ is high. Considering the experimental result of FIG. 5, and the wear-proof characteristics of FIG. 2, it is concluded that the preferable weight ratio of $S_iC$ to polyimide material is in the range between 1.25 and 3.2.

The process for attaching the protection layer on a substrate is described as follows. First, the filler ($S_iC$) is washed by using macro molecular surface active agent, then, it is combined with polyimide solution after drying. The polyimide resin including $S_iC$ is painted on the substrate which has a heater layer and a conductive lead through spin coating process at 2000–3000 R.P.M. so that a film with 10–15 μm of thickness is obtained. Then, the intermediate product is precured at 80° C. for 30 minutes to evaporate the solvent. Finally, the intermediate product is cured at 250° C. for one hour.

As described above, the present thermal head has the following advantages. First, since both substrate and protection layer are made of polyimide material which is low in cost, the total cost of the thermal head is also low. The protection layer is cured at relatively low temperature, and therefore, the cured process is simple. Although a polyimide film itself is not suitable as a protection layer, it exhibits the excellent characteristics as a protection layer by including some filler, an example of which is $S_iC$.

The present protection layer with filler can be coated on a substrate which is not heat-proof. Therefore, the present protection layer is coated on a polyimide substrate which is low in cost as compared with that of conventional ceramics substrate. The present polyimide film with the filler is used not only for a protection layer of a thermal head, but also for a protection layer of a general electronic circuit board, and for an insulation film of multi-layers printed circuit boards.

From the foregoing, it will now be apparent that a new and improved thermal head has been found. It should be understood of course that the embodiments dislcosed are merely illustrative and are not intended to limit the scope of the invention. Reference should be made to the appended claims, therefore, rather than the specification as indicating the scope of the invention.

What is claimed is:

1. A thermal head comprising a substrate, a heater layer and a conductive lead layer attached on the substrate, and a protection layer covering said heater layer CHARACTERIZED IN THAT said protection layer is polyimide resin including a hard filler of particles, said filler being one selected from $S_iC$, $Al_2O_3$, $S_{i3}N_4$, $S_iO_2$, and $T_{a2}O_5$, and weight ratio of the filler to the polyimide resin being in a range between 1.1 and 3.2.

2. A thermal head according to claim 1, said substrate being made of polyimide resin.

3. A thermal head according to claim 1, wherein average diameter of said filler particles is 2 μm.

* * * * *